Figure 1:
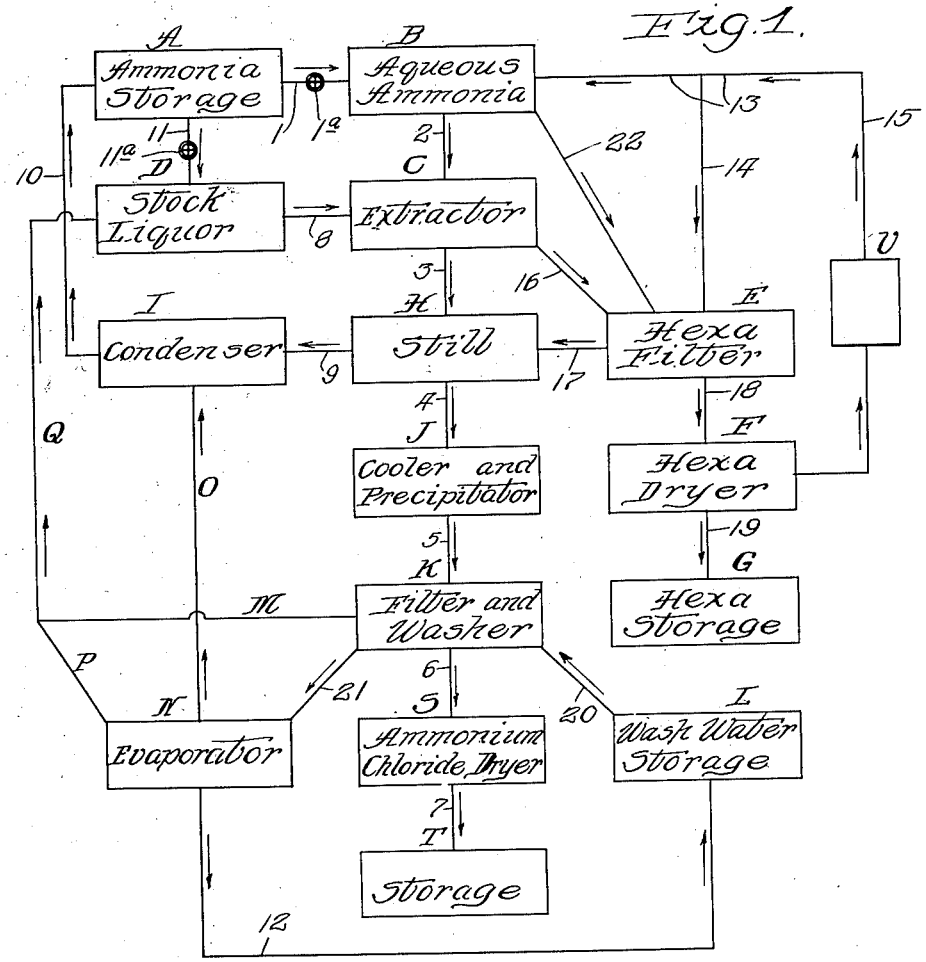

Dec. 22, 1925.

C. B. CARTER 1,566,821

RECOVERY OF HEXAMETHYLENETETRAMINE FROM MIXTURES CONTAINING AMMONIUM CHLORIDE

Filed July 26, 1924

Inventor:
Carnie B. Carter,
By Lyn Forth, Lee, Chritton
and Wiles, Attys.

Patented Dec. 22, 1925.

1,566,821

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

RECOVERY OF HEXAMETHYLENETETRAMINE FROM MIXTURES CONTAINING AMMONIUM CHLORIDE.

Application filed July 26, 1924. Serial No. 728,463.

*To all whom it may concern:*

Be it known that I, CARNIE B. CARTER, a citizen of the United States, residing at Pittsburgh, in the county of Allegheny and State of Pennsylvania, have invented a new and useful Improvement in the Recovery of Hexamethylenetetramine from Mixtures Containing Ammonium Chloride, of which the following is a specification.

The present invention relates particularly to a method for economically effecting the separation of hexamethylenetetramine from ammonium chloride.

The primary object is to obviate the necessity for using expensive solvents and to effect economy by reducing to a minimum the necessity for evaporation of water.

Methylene chloride reacts with ammonia to form hexamethylenetetramine and ammonium chloride in accordance with the following equation:

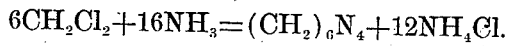

$$6CH_2Cl_2 + 16NH_3 = (CH_2)_6N_4 + 12NH_4Cl.$$

The reaction may be carried out in practice, as has been pointed out in earlier applications, either in aqueous or liquid ammonia solution.

When the reaction is carried out in liquid ammonia the recovery of hexamethylenetetramine from the reaction product offers no particular difficulty; it is a comparatively simple matter to separate the hexamethylenetetramine from the ammonium chloride by extraction with chloroform or other suitable solvent. Such solvents, however, are expensive and recovery accordingly is expensive.

When the reaction is carried out in aqueous ammonia solution the hexamethylenetetramine and ammonium chloride are obtained in aqueous solution from which hexamethylenetetramine and ammonium chloride cannot be obtained in a mechanically mixed form by simple evaporation of the water. The difficulty here is that secondary reactions take place during the evaporation which result in the loss of a part of the hexamethylenetetramine as formaldehyde and ammonia and which also result in the formation of considerable amounts of hexamethylenetetramine hydrochloride. The residual salt mixture recovered by such evaporation when extracted with chloroform or other suitable solvents does not yield the full theoretical amount of hexamethylenetetramine, and under some conditions may give only a small proportion of the theoretical yield. It is essential, therefore, that the evaporation of such solution shall be performed under such conditions that free ammonia shall be present in the solution and salt mixture at all times during the evaporation and drying. If these precautionary measures are taken, complete recovery of hexamethylenetetramine from the residual salts may be made. In whatever manner the hexamethylenetetramine is produced, however, the problem of effecting separation in an inexpensive manner is important.

In my pending application No. 691,673, filed in the United States Patent Office, February 9, 1924, is described a process by which hexamethylenetetramine may be produced very advantageously by a reaction between methylene chloride and aqueous ammonia, the reaction being greatly facilitated by the use of a large excess of ammonia. However, it is now evident that, from a practical standpoint, one of the chief difficulties to be overcome in the manufacture of hexamethylenetetramine from methylene chloride, using aqueous ammonia solutions, is that of recovering the hexamethylenetetramine from the reaction liquor. In the present invention, advantage is taken of an increased solvent effect of aqueous solutions for ammonium chloride and a decreased solvent effect of such solutions for hexamethylenetetramine by introducing into, or surcharging, the solution with ammonia gas. The ammonia gas can be distilled off and recovered at small expense. By the improved method, it is possible to avoid the use of expensive solvents and to lower the evaporating costs greatly.

The solvent power of water for hexamethylenetetramine is greatly reduced by saturating the solution with ammonia. Hexamethylenetetramine is soluble to the extent of about 90 grams per 100 cc. of water, in the absence of ammonia, but the solvent power is reduced to 10 or 15% of this amount if the water be surcharged with ammonia. It is possible to precipitate as much as 90% of hexamethylenetetramine from a saturated solution by introducing ammonia gas into the solution. In liquid ammonia, the hexamethylenetetramine concentration becomes almost negligible; and in an aqueous solution of hexamethylenetetramine completely saturated with ammonia, the hexamethylenetetramine concentration is very low, indeed.

On the other hand, the introduction of ammonia into an aqueous solution of ammonium chloride greatly increases the solubility for ammonium chloride. Water dissolves about 39 grams of ammonium chloride per 100 cc. at ordinary temperatures and about 77 grams per 100 cc. at 90° C. The introduction of ammonia into the solution increases the solvent power of water with increasing ammonia concentration, and 100 cc. of water at ordinary temperatures carrying 21.8 grams of ammonia per 100 cc. of solution will dissolve 63.5 grams of ammonium chloride. Liquid ammonia will dissolve still more ammonium chloride than will an aqueous solution saturated with ammonia. There is, of course, an expansion of the aqueous solution during the introduction of ammonia, so that the amount of either hexamethylenetetramine or ammonium chloride which will be held in solution per 100 cc. of the solution itself is less than when expressed in terms of the original 100 cc. of water.

The solvent power of aqueous ammonia solutions for hexamethylenetetramine and ammonium chloride each, is not appreciably affected by the presence of both these substances in the same solution. In the following table, the solubilities of hexamethylenetetramine and ammonium chloride in aqueous ammonia solutions are expressed in grams of 100 cc. of solution, and also per 100 cc. of water.

*Solubilities.*

| Per 100 cc. of solution. | | | Per 100 cc. of water. | | |
|---|---|---|---|---|---|
| NH₃ | Hexa. | NH₄Cl. | NH₃ | Hexa. | NH₄Cl. |
| 0.0 | 47.5 | 20.2 | 0.0 | 90.5 | 38.6 |
| 5.3 | 33.6 | 21.2 | 10.6 | 67.5 | 42.4 |
| 8.1 | 29.7 | 21.9 | 15.5 | 60.5 | 44.6 |
| 13.8 | 21.1 | 24.7 | 30.8 | 47.1 | 55.2 |
| 28.4 | 4.2 | 24.2 | 76.9 | 11.2 | 65.5 |

It is very clear that there is a very marked decrease in the solubility of hexamethylenetetramine with rising ammonia concentration, and, at the same time, a marked increase in the solubility of ammonium chloride in the same solution. In fact, the solubility of hexamethylenetetramine is reduced about 87.6%, and the solubility of ammonium chloride is increased to about 170% of its former value.

Saturation of the solutions shown in the foregoing experiments was carried out at somewhat lowered temperatures. It is to be noted, however, that the same effects can be secured at higher temperatures if the ammonia is introduced into the solution, under pressure.

The phenomena mentioned above can be employed in a practical way in the recovery of hexamethylenetetramine from mixtures containing ammonium chloride. The mixture may be composed of the dry salts obtainable, for example, by producing hexamethylenetetramine by a reaction between liquid ammonia and methylene chloride, in which reaction ammonium chloride is formed as a by-product, or the mixture may be composed of the wet salts, such as may be obtained from a reaction between methylene chloride and aqueous ammonia. The same phenomena may be taken advantage of in effecting separation of these salts from solutions thereof, produced by a reaction between methylene chloride and aqueous ammonia, as set forth in my co-pending application No. 728,464, filed of even date herewith.

The present application describes that species of the method which is employed to recover hexamethylenetetramine either from a mixture of the dry salts, or from a wet mixture of salts, after the mother-liquor has been removed from the salts as far as practicable.

The process will first be described with reference to the extraction of hexamethylenetetramine from a mixture of the dry salts, such as may be obtained by reacting upon methylene chloride with liquid ammonia. It will be understood that the purpose is to avoid the use of expensive solvents and unnecessary application of heat.

The accompanying drawing represents diagrammatically methods which are employed in the process. In the diagram shown in Fig. 1, the method of effecting separation of hexamethylenetetramine from a mixture of dry salts is illustrated. In Fig. 2, a method of producing hexamethylenetetramine from methylene chloride and aqueous ammonia is illustrated. By this method, the wet, or damp mixture of salts may be collected in the extractor G, which corresponds with the extractor C shown in Fig. 1. In other words, the damp, or wet salts may be produced by the method illustrated in Fig. 2; and these salts may then be subjected to the extracting process illustrated in Fig. 1.

Figure 2:
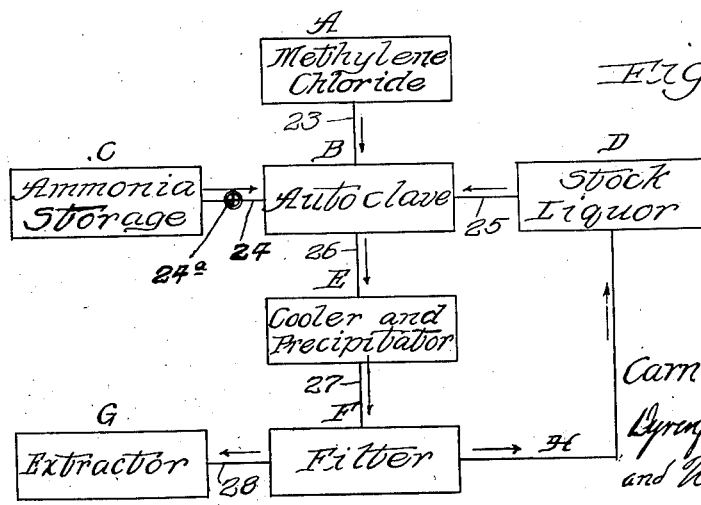

Referring to Fig. 1, A represents an ammonia storage-tank, which may contain liquid ammonia; B, an aqueous ammonia storage-tank; C, an extractor in which the mixture of hexamethylenetetramine and ammonium chloride are placed for extraction purposes; D, a storage-tank for extractor liquor, which may be termed stock liquor used in the process; E, a filter, or centrifuging machine, into which the hexamethylenetetramine is passed from the extractor C after the ammonium chloride has been removed as a solution; F, a dryer for hexamethylenetetramine; G, a hexamethylenetetramine storage chamber; H, a still which receives the saturated aqueous solution of ammonium chloride, surcharged with ammonia, from the extractor C; I, a condenser where the ammonia from the still H is condensed and from which the ammonia is returned to storage A; J, a cooler and precipitator, which receives the solution of ammonium chloride from the still and in which a large percentage of the ammonium chloride is precipitated; K, a filter and washer for the precipitated ammonium chloride; L, a wash-water storage-tank containing water freed from ammonia and employed for washing the ammonium chloride on the filter; M, a line leading from the filter K to the stock liquor tank D; N, an evaporator which receives the wash-water from the filter K and which is connected by an ammonia pipe O with the condenser I and which is connected also by a pipe P with a line Q which serves as a common return for the lines M and P to the stock liquor tank D; S, an ammonium chloride dryer; and T, an ammonium chloride storage chamber.

Additional connecting lines, or routes, between the various chambers and devices are designated 1-22 inclusive. The pipes 1 and 11 leading from the liquid ammonia tank A may be equipped with reducing valves 1ᵃ and 11ᵃ.

The mixture of salts to be extracted is placed in the extractor C and there is treated with a liquor from storage D consisting of an aqueous solution of ammonium chloride surcharged with gaseous ammonia, preferably the ammonia is used in sufficient quantity to completely saturate the liquor, but it may be used in smaller proportion as will be evident from the table given above. The liquor flows through extractor C, becomes saturated with ammonium chloride, and discharges into still H. Here most of the ammonia is distilled off, passes through condenser I and returns to a storage A. The liquor from still H flows into the cooler and precipitator J where the cool liquor deposits much of its ammonium chloride (solubility in the hot about 77 grams, in the cold about 39 grams per 100 cc. of water); thence, it passes into the filter and washer K, where the ammonium chloride is filtered, and then washed. The mother-liquor flows through pipes M and Q back to storage D, where it is again surcharged with ammonia and passes again through the cycle. The wash-water for filter K is free from ammonia and is drawn from storage L. It is discharged into evaporator N, which distills off ammonia and returns it to the system through pipe O. The evaporator also removes surplus water and returns it to storage L, and finally returns the concentrated liquor through pipes P and Q to the stock liquor tank D. The recovered ammonium chloride passes from the filter K into the dryer S and finally to the storage T.

The process of extraction is continued until only the hexamethylenetetramine remains in the extractor C, together with such amounts of the extractor liquor as adheres to the product. The product then is discharged into filter E where the liquor is separated as completely as possible. The hexamethylenetetramine is washed on the filter with pure aqueous ammonia from the tank B, the filtrate going back into the system, as indicated. The hexamethylenetetramine then goes to the dryer F and finally into storage G. The vapors from dryer F pass through a condenser V and are returned to storage-tank B for further use.

The system is a closed one, and theoretically, there is neither loss nor gain in the amount of water or ammonia contained in the system. A certain amount of evaporation of water is necessary for operation, however, to compensate for the wash-water introduced and to maintain the proper balance in the system. Thus, the ammonium chloride recovered in filter K has some mother-liquor adhering to it, this liquor containing some hexamethylenetetramine in solution. For this reason, the ammonium chloride is washed to effect recovery of this hexamethylenetetramine. In like manner, the hexamethylenetetramine is washed in the filter E with water surcharged with ammonia. Here, the purpose is to prevent the taking up of hexamethylenetetramine by the water, and hence ammonia is used. In the washing of the ammonium chloride, the use of ammonia is avoided to prevent the unnecessary dissolving of ammonium chloride.

Referring to Fig. 2, A represents a supply of methylene chloride; B, an autoclave; C, an ammonia storage-tank; D, a tank containing stock liquor, which may be an aqueous solution of ammonium chloride and hexamethylenetetramine; E, a cooler and precipitator; F, a filter; G, an extrator; and H, a return line by which the mother-liquor may be returned to the stock liquor tank D.

Connections, or routes, are indicated by the lines designated 23—28.

The tank C may contain liquid ammonia, and the line 24 may be equipped with a reducing valve 24ᵃ.

Methylene chloride and ammonia are introduced into the autoclave, the ammonia being taken in sufficient amount to combine with the methylene chloride and form hexamethylenetetramine and ammonium chloride. To facilitate the reaction, the ammonia is preferably used in excess to an extent of 300 or 400% of the theoretical proportions.

The mixture is heated in the autoclave to a temperature of about 100° C. After the reaction is completed, the materials are discharged into the cooler E, where a considerable portion of the salts are deposited. The materials are then passed to the filter F, where the salts are separated from the mother-liquor, and the liquor is returned to the tank D. The salts are passed to the extractor G.

As previously explained, the extractor G corresponds with the extractor C in the system, shown in Fig. 1. The wet salts may be placed in such an extractor, and separation effected by the method previously described with reference to Fig. 1.

Referring to the system shown in Fig. 2, no means is illustrated for distilling off the ammonia and returning it to storage. Such provision may be made, however.

It may be noted with reference to Fig. 1 that if it be not desired to dry the ammonium chloride, this step may be omitted. Thus, for example, if the ammonium chloride is to be converted into ammonia, the product may be passed, without drying, to the ammonia recovery plant.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The method of effecting separation of hexamethylenetetramine from ammonium chloride which comprises employing aqueous ammonia in strong solution, whereby the solvent power for hexamethylenetetramine is decreased and the solvent power for ammonium chloride increased.

2. The method of effecting separation of hexamethylenetetramine from ammonium chloride which comprises placing said substances in aqueous solution strongly charged with ammonia.

3. The method of effecting separation of hexamethylenetetramine from ammonium chloride which comprises treating said substances with an aqueous solvent strongly charged with ammonia, such solvent serving to dissolve ammonium chloride in large proportions and hexamethylenetetramine in small proportions, withdrawing the solution and distilling off the ammonia to lower the solvent power for ammonium chloride, effecting precipitation of ammonium chloride, and continuing the operation until the ammonium chloride has been placed in solution and removed from the hexamethylenetetramine.

4. The method of effecting separation of hexamethylenetetramine from ammonium chloride which comprises treating said substances with an aqueous solvent strongly charged with ammonia, such solvent serving to dissolve ammonium chloride in large proportions and hexamethylenetetramine in small proportions, withdrawing the solution and distilling off the ammonia to lower the solvent power for ammonium chloride, effecting precipitation of ammonium chloride, continuing the operation until the ammonium chloride has been placed in solution and removed from the hexamethylenetetramine, and filtering and washing the hexamethylenetetramine.

5. The method of effecting separation of hexamethylenetetramine from ammonium chloride which comprises placing a mixture of said substances in an extractor, and continuously passing through said extractor an aqueous solvent strongly charged with ammonia, whereby ammonium chloride will be dissolved and removed as a solution and the hexamethylenetetramine will remain.

6. The method of separating hexamethylenetetramine from ammonium chloride which comprises passing through an extractor containing said substances, an aqueous liquor containing ammonium chloride in solution and strongly charged with ammonia, whereby ammonium chloride is dissolved in large proportions, withdrawing the solution from the extractor, distilling off the ammonia to lower the solvent power for ammonium chloride, cooling the liquor and effecting precipitation of a part of the ammonium chloride, separating the precipitate from the filtrate and returning the filtrate to the solvent source of supply, and continuing said operation until substantially all of the ammonium chloride in the extractor has been dissolved.

7. The method of effecting separation of hexamethylenetetramine from ammonium chloride which comprises circulating through an extractor containing said substances an aqueous solvent containing ammonium chloride in solution and substantially saturated with ammonia, whereby ammonium chloride will be dissolved in large proportions and hexamethylenetetramine will be dissolved in small proportions, withdrawing the solution and distilling off the ammonia to lower the solvent power for ammonium chloride, cooling the liquor from the still and precipitating a portion of the ammonium chloride, separating the precipitated ammonium chloride from the filtrate, returning the filtrate to the source of solvent supply and repeating the operation until the ammonium chloride in the extractor has been substantially dissolved and removed, subjecting the remaining hexamethylenetetramine to a filtering and washing operation, and drying the hexamethylenetetramine.

8. The method of effecting separation of hexamethylenetetramine from ammonium chloride which comprises passing an aqueous solvent strongly charged with ammonia through an extracting vessel containing said materials and thus dissolving out and removing the ammonium chloride, the hexamethylenetetramine being left behind, and washing the hexamethylenetetramine with aqueous ammonia and filtering it.

9. The method of effecting separation of hexamethylenetetramine from ammonium chloride which comprises circulating through an extractor containing said substances a liquor comprising an aqueous solution of ammonium chloride and hexamethylenetetramine strongly charged with ammonia, thus loading the liquor with additional ammonium chloride, removing the solution from the extractor and distilling the ammonia to lower the solvent power for ammonium chloride and returning the ammonia to the source of supply, withdrawing the solution from the still and cooling it to effect precipitation of ammonium chloride, filtering and washing the ammonium chloride and returning the mother-liquor to a source of supply for the extractor, removing the hexamethylenetetramine from the extractor and washing and filtering it, drying the hexamethylenetetramine, and returning the aqueous ammonia to a source of supply, and evaporating from the system enough water to maintain a balance and compensate for any wash-water introduced into the system.

CARNIE B. CARTER.